No. 888,968. PATENTED MAY 26, 1908.
F. P. DEWEY.
CIRCULATION.
APPLICATION FILED FEB. 26, 1906.

Witnesses
W. May Duvall
J. T. Bryant

Inventor
Frederic Perkins Dewey

UNITED STATES PATENT OFFICE.

FREDERIC PERKINS DEWEY, OF WASHINGTON, DISTRICT OF COLUMBIA.

CIRCULATION.

No. 888,968.     Specification of Letters Patent.     Patented May 26, 1908.

Application filed February 26, 1906. Serial No. 303,082.

*To all whom it may concern:*

Be it known that I, FREDERIC PERKINS DEWEY, a citizen of the United States, residing at Washington, in the District of Columbia, have invented certain new and useful Improvements in Circulation, of which the following is a specification.

My invention relates to an improvement in circulation, whereby a current of reactive gas causes a steady circulation of liquid, and primarily to the treatment of copper ores, but it is also applicable for producing chemical changes in general by the action of gases on liquids, and especially liquids holding finely divided material in suspension to be acted upon by the liquid.

My invention consists in causing the circulation of the liquid by the particular manner of introducing the reactive gas into the liquid in addition to bringing the gas and liquid into intimate contact under conditions most favorable for accomplishing the desired chemical changes.

Figure 1:
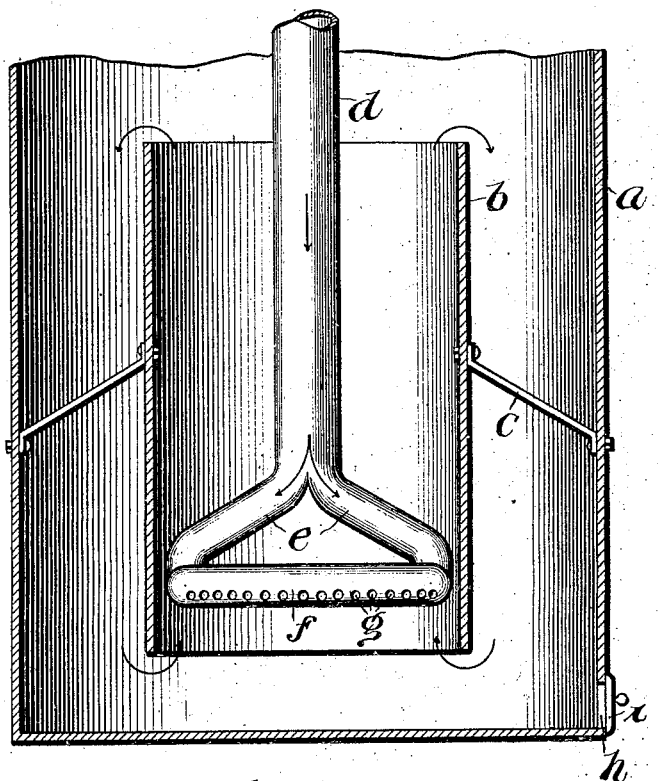
Figure 2:
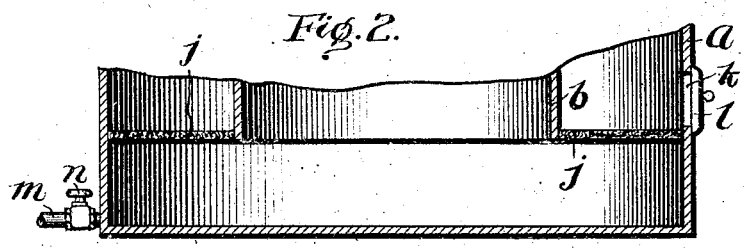

In the accompanying drawings:—Figure 1 represents a vertical section of my improved apparatus and Fig. 2 is a similar section of a part of a modification.

My apparatus consists of a containing vessel or tank $a$, which may be constructed of any suitable material according to the character of the liquid operated upon and the chemical re-actions which take place, such as wood, stone, metal, cement, earthen-ware, etc. This tank may be open or provided with a cover as desired. Within the tank is a tube $b$, open at both ends and suitably supported so as to be separated by an annular space from the tank $a$. This tube may be supported by inclined braces $c$, as shown in Fig. 1, or by braces from the bottom of the tank, or it may be hung by straps from the cover. It may be made of the same material as the tank $a$, but is not necessarily so made.

Within the tube or cylinder $b$ is a gas inlet pipe $d$, which communicates by two or more branches $e$ with a horizontal ring $f$ provided with numerous perforations $g$, located near the bottom.

I do not restrict myself, however, to the form shown in Fig. 1, as the lower end of this pipe $d$ may be a simple closed pipe with small holes drilled in the end and even part way up the sides. It may also end in a suitable perforated coil, or it may be branched and the branches perforated.

In Fig. 1, I have shown this pipe $d$ as coming in through the top of the tank, but, obviously, it may come in through the bottom or through the sides, the essential point being that this tube shall be perforated so as to deliver numerous small bubbles of gas into the tube $b$ at various points, when the apparatus is in operation.

A suitable discharge opening $h$ is provided near the lower part of the tank, which may be closed by a door $i$. The ore or other material to be treated is fed in at the top of the tank, preferably outside of the tube $b$. When the tank $a$ is covered, the cover may be provided with suitable openings for introducing the charge and for the escape of the waste gases. If desired, said gases may be caused to escape through a weighted valve in order to maintain a certain pressure during the operation of the gases. The re-active gases are caused to pass through the pipe $d$ by any suitable blowing apparatus, such as an air pump or fan, and in case the material operated upon is of such a character that the re-actions are facilitated by heat, the gases may be forced in by a steam blower, such as the well known Körting steam blower. In some cases, if the tank $a$ is provided with a tight cover, the gases may be caused to pass through the pipe $d$ by a suction apparatus applied near the top of the tank $a$.

The operation of my device as shown in Fig. 1, is as follows:—The liquid to be operated upon, or the liquid containing comminuted material in suspension, is introduced into the tank $a$ to the proper depth, preferably just below the top of the tube $b$. The tube $b$ being open at the bottom is simultaneously filled. Then the re-active gases or mixture of gases designed to act chemically on the liquid, or upon the solid suspended in the liquid, is forced into the liquid through the perforations in the pipe $d$ and bubbles up through the tube $b$, carrying the liquid and solid matter suspended therein with it, thereby causing an upward flow through the tube $b$, and consequently, a downward flow around said tube, thus thoroughly mixing the gases, liquid, and solid, and facilitating the chemical re-actions, on account of the vigorous stirring of the whole mass, and because each bubble presents to the liquid a large surface of gas, which is thus rapidly absorbed, and this also hastens the chemical re-actions desired. The circulation is caused by the fact that the numerous bubbles of gas in the tube $b$ render the liquid therein of a less specific gravity than the liquid outside of the tube $b$, whereupon the liquid in the tube $b$ rises and flows over the edge thereof, while the liquid outside of the tube $b$ falls and enters said tube at the bottom. As soon as the liquid reaches the top of the tube $b$, it of course loses its residual gas and becomes heavier, which also aids in the downward flow of the liquid around the outside of the tube $b$.

In the modification shown in Fig. 2, the lower part of the tube $b$ is connected with the tank $a$ by a filtering material $j$. In this case the tank $a$ is provided with an opening $k$ just above the filtering material $j$ for the discharge of the solid material, which opening is closed by a door $l$, $m$ represents a pipe for the discharge of the liquid, which is provided with a valve $n$. In this modification the solid does not circulate to any appreciable extent around the tube $b$, as the filter $j$ prevents this.

In some cases the primary chemical action upon the liquid itself or the salts held in solution, may be all that is desired, but in many cases, secondary chemical re-actions may be obtained on the solid material held in suspension in a finely divided condition within the liquid, which solid circulates with the liquid, and this is the chief application of my invention. By it the cost of carrying on various chemical and metallurgical processes is greatly reduced, while some materials which at present cannot be treated to advantage by any known means, and which are therefore valueless, can be treated by my invention at a good profit, such for instance, are the low grade oxidized silicious copper ores which occur in large quantities at different places, but which are not now mined because the copper which they contain cannot be economically recovered by any known method.

In some cases, however, it may be desirable to produce chemical changes in the liquid within the tube $b$ and to employ the chemical substances thus produced in acting on solid material packed around the tube $b$. In this case, the apparatus shown in Fig. 2 is used.

The treatment of the low grade oxidized silicious copper ores, which my invention is especially designed for, varies according to the character of the ore. If the ore carries the copper finely disseminated through a comparatively close gangue, it is crushed fine, so that it will pass through a sieve from sixty to one hundred mesh or more and introduced into the apparatus at any convenient point with enough water to make an easily flowing pulp. Then a mixture of sulfurous acid, $SO_2$, and air is passed into the apparatus through the pipe $d$, preferably by a Körting injector. Perhaps the simplest way of considering the chemical re-action is to consider that the sulfurous acid first attacks the copper, forming copper sulfite, and this is immediately oxidized by the air to copper sulfate, but other re-actions are quite possible, and the re-actions which really take place are undoubtedly much more complex. However, the final result of the joint action of the air and sulfurous acid is the formation of copper sulfate which goes into solution in the water.

The sulfurous acid required may be obtained in any suitable way, as by the combustion of sulfur in an ordinary sulfur burner, or by the roasting of pyrites, or similar sulfuret ores in any of the ordinary roasters. In some cases, the gases obtained from the roasting of auriferous sulfids in preparing them for further treatment may be utilized to advantage.

When the copper in the ore has practically all gone into solution, the charge is withdrawn from the apparatus. The residue is then separated from the solution by any ordinary means, as by filtering and washing. The residue may then be treated for the recovery of any valuable metal it may still contain, or otherwise utilized, or it may be thrown away.

The copper sulfate solution may be treated in various ways to utilize the copper it contains. Crystalized bluestone may be recovered from it in the ordinary way. It may be run over scrap iron to precipitate the copper as cement copper, which is then melted and refined to ingot copper. The copper may be recovered by the electric current in the ordinary way, or the solution may be utilized in various other ways. The last washings of the ore residue, which are low in copper, are preferably returned to the dissolving apparatus to be used in the treatment of a fresh lot of ore.

When, however, the ore is open and porous, or the copper is coarsely disseminated through the gangue, a high extraction can often be secured by employing the modified apparatus having a filter, as shown in Fig. 2. In this case, the coarsely crushed ore is fed into the space between the parts $a$ and $b$ upon the filter with the addition of the proper amount of water, or preferably washings from a previous charge. A mixture of sulfurous acid and air is then forced in through the pipe $d$, when the sulfurous acid is oxidized by the oxygen of the air, particularly in the presence of oxygen transferring agents such as sulfate of copper, forming sulfuric acid, which flows up through the tube $b$ and down outside of it upon the ore. Here the acid attacks the copper, forming sulfate of copper as before, and the solution travels on until it comes into the bottom of the tube $b$ again, where it is charged with more acid, this action continuing over and over. The circulation is continued until practically all the copper is dissolved out of the ore, when the solution is withdrawn and treated for the copper it contains and the residue washed and disposed of.

Low grade sulfuret ores of copper may be roasted and then treated by my invention, and the gases obtained in the roasting may be utilized as a source of the sulfurous acid in dissolving the copper out of the roasted ore. Furthermore, copper matte may be roasted and treated for the production of bluestone in my apparatus, and the gases developed in the preparation of the matte will supply the sulfurous acid required.

While my invention is especially designed for treating copper ores, it is evident that it may be used for various other purposes, such as in the cyanid process of extracting precious metals, in the boiling of wood to convert it into paper pulp, and for the preparation of the solution of alkaline sulfite used in pulp boiling. Furthermore, water may be aerated or purified, oils bleached, and solutions freed from iron by blowing air through them, and the air may be ozonized previous to its use in my apparatus for any desired purpose.

In the drawing I have shown the gas delivery pipe within the inner tube. It is obvious, however, that it could be located in the space between the outer and the inner tube, in which case the direction of the circulation of liquid would be reversed, for example: a perforated circular pipe could be used in the annular space between the tank $a$ and the tube $b$.

Having thus described my invention, what I claim as new and desire to secure by Letters Patent, is:—

1. The double process of carrying on chemical re-actions and causing the circulation of a liquid, which consists in maintaining two columns of liquid in direct contact at their lower ends, introducing numerous bubbles of re-active gas at various points within one column of the liquid, permitting the gas to re-act freely with the liquid, allowing the residual gas to escape from the liquid, and causing the liquid to move in a circulatory path by this alternate addition and escape of gas, substantially as described.

2. The process of treating comminuted material suspended in a liquid, which consists in introducing numerous bubbles of re-active gas at various points within a portion of the liquid, permitting the gas to re-act with the liquid, allowing the residual gas to escape from the liquid and causing the liquid and the comminuted solid suspended therein to move in a circulatory path by this alternate addition and escape of gas, substantially as described.

3. The process of treating ores, which consists in crushing the ore, mixing the comminuted ore with a liquid and introducing numerous bubbles of re-active gas at various points within a portion of the liquid, permitting the gas to re-act with the liquid, allowing the residual gas to escape from the liquid, and causing the liquid and the comminuted ore suspended therein to move in a circulatory path by this alternate addition and escape of gas, substantially as described.

4. The process of treating copper ores, which consists in crushing the ore, mixing the comminuted ore with a liquid, introducing numerous bubbles of a mixture of air and sulfurous acid at various points within a portion of the liquid, permitting the gas to re-act with the liquid, allowing the residual gas to escape from the liquid, and causing the liquid and the comminuted ore suspended therein to move in a circulatory path by this alternate addition and escape of gas, substantially as described.

5. The process of treating copper ores, which consists in crushing the ore, mixing the comminuted ore with a liquid, introducing numerous bubbles of a mixture of air and sulfurous acid at various points within a portion of the liquid, permitting the gas to react with the liquid, allowing the residual gas to escape from the liquid, causing the liquid and the comminuted ore suspended therein to move in a circulatory path by this alternate addition and escape of gas, separating the solution of sulfate of copper, thereby produced, from the residual ore, and recovering the copper from the solution, substantially as described.

In testimony whereof I affix my signature in presence of two witnesses.

FREDERIC PERKINS DEWEY.

Witnesses:
E. S. RUSSELL,
J. T. BRYANT.